(12) United States Patent
Yu et al.

(10) Patent No.: US 12,515,341 B2
(45) Date of Patent: Jan. 6, 2026

(54) AUTOMATIC ACCOMPANYING SYSTEM

(71) Applicant: National Yang Ming Chiao Tung University, Hsinchu (TW)

(72) Inventors: Chung-Huang Yu, Taipei (TW); Hsiao-Kuan Wu, Taipei (TW); Ying-Chun Jheng, Taipei (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 632 days.

(21) Appl. No.: 16/651,797

(22) PCT Filed: Sep. 28, 2017

(86) PCT No.: PCT/CN2017/103890
§ 371 (c)(1),
(2) Date: Mar. 27, 2020

(87) PCT Pub. No.: WO2019/061126
PCT Pub. Date: Apr. 4, 2019

(65) Prior Publication Data
US 2020/0238527 A1 Jul. 30, 2020

(51) Int. Cl.
*B25J 9/16* (2006.01)
*G05D 1/00* (2024.01)

(52) U.S. Cl.
CPC .......... *B25J 9/1694* (2013.01); *G05D 1/0212* (2013.01); *A61B 2503/08* (2013.01); *A61B 2560/0431* (2013.01)

(58) Field of Classification Search
CPC ................. B25J 9/1694; G05D 1/0212; G05D 2201/0206; G05D 1/0227; G05D 1/0238;
(Continued)

(56) References Cited

U.S. PATENT DOCUMENTS

| | | | |
|---|---|---|---|
| 6,285,930 B1 | 9/2001 | Dickson et al. | |
| 10,180,683 B1* | 1/2019 | Libman | ................. G05D 1/0246 |
| 2017/0122824 A1* | 5/2017 | Depinet | .................... G01L 5/10 |

FOREIGN PATENT DOCUMENTS

| | | |
|---|---|---|
| CN | 106375716 A | 2/2017 |
| CN | 106444752 A | 2/2017 |

(Continued)

*Primary Examiner* — Sihar A Karwan
(74) *Attorney, Agent, or Firm* — MUNCY. GEISSLER, OLDS & LOWE, P.C.

(57) ABSTRACT

The present invention provides an automatic accompanying system, comprising an user and a accompanying unit following the user, wherein the accompanying unit follows the user according to the user's movement and truning action. The automatic accompanying system comprises: a first pointing unit, a relative position sensing unit and a control module, wherein the first pointing unit detects a facing direction of the user. The accompanying unit collects an orientation signal of the user and a relative position signal for analyzing and generates an instruction signal to control itself to move and turn. Through the said accompanying system, the purposes of accompanying a user in multiple positions, like in the front, behind, by the side, above, increasing safety, reducing the risk of loss, and saving users from paying too much attention on operating the system can be achieved, and it facilitates user to carry out related applications.

17 Claims, 13 Drawing Sheets

(58) Field of Classification Search
CPC ........ G05D 2201/0211; A61B 2503/08; A61B 2560/0431; A61B 5/1122; A61B 5/6831; A61B 2560/0437; A61B 2560/0462; A61B 2562/0219; A61B 2562/0223; A61B 2562/0233; A61B 5/1114; A61H 1/00

See application file for complete search history.

(56) References Cited

FOREIGN PATENT DOCUMENTS

| | | | | |
|---|---|---|---|---|
| CN | 106647730 | A | 5/2017 | |
| CN | 106851101 | A | 6/2017 | |
| CN | 107145151 | A | 9/2017 | |
| JP | 4714036 | B2 | 6/2011 | |
| JP | 2015141506 | A | 8/2015 | |
| WO | WO-2017180566 | A2 * | 10/2017 | ............. A61B 6/035 |

* cited by examiner

AUTOMATIC ACCOMPANYING SYSTEM

CROSS-REFERENCE TO RELATED APPLICATION

This application claims priority to China PCT Application No. 2017/103,890, filed on Sep. 28, 2017, the entire content of which is hereby incorporated by reference herein in its entirety.

BACKGROUND OF THE INVENTION

Technical Field of the Invention

The present invention relates to an automatic accompanying system, and more particularly to an automatic accompanying system that simultaneously senses user's movements and truning actions and makes an accompanying movement corresponding to the movements and truning actions.

Background

Due to the decline in fertility and the increase in life expectancy, the problem of aging populations is getting serious in the worldwide. The population structure of each country is quite different from which in the undeveloped period. Internationally, the ratio of the elderly population over 65 years old in total population is used as a basis for evaluating the aging situation. If the ratio is higher than 7%, it is considered as an aging society. If the ratio is higher than 14%, it is called as an aged society. Once the ratio is more than 20%, the society is called super aged society.

According to statistical data, the elderly population has grown significantly, and the aging degree is high in Asian regions such as Taiwan and Japan. Therefore, the government is actively promoting elderly caring plan for helping the elderly taking care of themselves and reducing social burden and social cost at the same time in order to create a new elder friendly society. There are many issues about aging population that needs to be discussed and improved. For example, most of the young and middle-aged people are away from home and unable to take care of the elderly, so the elderly need to go out alone. In addition, there are up to 50% of the elderly lacking exercise which can accelerate aging process. And normally, it is because that aging causes the functions of human body becoming weaken or the elderly is easy to have difficulty in moving and responding slowly. As a result, the lack of exercise intensifies the aging of human body and becomes the beginning of a vicious circle. These information highlights the importance of the elderly care issue and assistive technology development.

Nowadays, the common assistive equipment for going out is like traditional crutch, walker or mobility aids, but there is no such equipment developed with the comprehensive functional needs of going out for walking, medical treatment and shopping. Recently, power-assisted control and auto-accompanying technologies have gradually become popular, such as COWAROBOT R1, Smartbe stroller, Budgee, LG Cordzero vacuum and automatic accompanying golf carts. These products are all with an accompany function; however, they are all operating in a way following behind the users. If these prior arts are used in the elderly care field, the equipment with accompany function will occur different problems compared to prior arts. For instance, products that operate in "following behind" way, like accompanying robot Budgee, have insufficient sensitivity when user turns, or the robot encounters an obstacle. Furthermore, user has to constantly turn back to check upon if the robot is still accompanying, which is causing inconvenience for user to walk. Therefore, an automatic accompanying system that can automatically accompany in front of user in a very sensitive and immediate way will meet the needs of the elderly.

The technical thresholds and requirements for a sensitive, real-time and accurate automatic accompanying system following in the front are higher than those following behind and other prior arts, and there are still some technical limitations needed to be overcome. First, the tolerance to the delay of sensing signal in accompanying system following ahead of user. In other words, accompanying system following behind user has a lower demand for immediately responding after sensing user, and it is allowable that the system has a slight delay and then keeps up with user again. But if the delay occurs in the accompanying system moving ahead of user, it will block user's walking path and interfere with user's activity. Second, the forward accompanying system requires a mobile platform. Because the moving path of follow-up system does not intersect with the user's walking path, the follow-up system can delay a bit and then re-calculate a shortest route to catch up again when user changes the walking direction; however, if the forward accompanying system adjusts direction and moving speed too slowly (possibly caused by algorithms, sensors, or mobile platform), there is a chance that the re-calculated route intersects with user's route. Third, the algorithm applied to forward accompanying system. The way how user walks is variable. Except walking forward and backward in responding to sudden conditions happening in environment, there may be many unpredictable scenarios such as sudden side shifts, turns or turning around. Therefore, a preset operating method cannot handle such complicated situations.

Based on the above reasons, the present invention provides an automatic accompanying system and a method thereof for resolving these limitations of prior arts, helping the elderly maintaining proper physical activity for keeping organs functional and elevating the willingness of the elderly for going out.

SUMMARY OF INVENTION

The main purpose of the present invention is to provide an automatic accompanying system. Through the design of the system, the accompanying unit of the system can move along with the user according to user's facing direction and the relative position between the unit and the user. Therefore, the system can turn and move to a preset position immediately and accurately according to user's movement.

The other purpose of the present invention is to provide a method of using the automatic accompanying system. By the method, the accompanying unit detects and determines a relative position and steering relationship with the user for moving along instantly with the user's movement in a preset relative position.

Another purpose of the present invention is to provide a method of using the automatic accompanying system. With the method, a user can touch or pull a strip connected to the accompanying unit for controlling the turning, moving and other technical functions of the accompanying unit.

Another purpose of the present invention is to provide another method of using the automatic accompanying system. By using the automatic accompanying system with the method, the goals of following ahead, elevating security, reducing the risk of loss can be achieved and the convenience of use is improved, thereby reducing the extra burden on society and the risk of the elderly going out.

In order to achieve the above purposes, the present invention discloses an automatic accompanying system, comprising a user and an accompanying unit following the user, wherein the accompanying unit follows the user according to the user's movement and truning action. The automatic accompanying system comprises: a first pointing unit, disposed on an arbitrary position of the automatic accompanying system for detecting a facing direction of the user and obtaining an orientation signal of the user; a relative position sensing unit, disposed on an arbitrary position of the automatic accompanying system for determining a relative position relationship between the accompanying unit and the user and obtaining a relative position signal; a control module, disposed on an arbitrary position of the automatic accompanying system for receiving and analyzing the orientation signal of the user and the relative position signal to generate and transmit an instruction signal; and an accompanying unit, comprising a driving unit and at least one moving element, wherein the driving unit receives the instruction signal and drives the at least one moving element to move the accompanying unit to a specific position and perform a corresponding turning action.

In one embodiment of the present invention, it discloses that the automatic accompanying system further comprises a second pointing unit, disposed on the accompanying unit to detect a facing direction of the accompanying unit and obtaining an orientation signal of the accompanying unit.

In the other embodiment of the present invention, it also discloses that the control module receives and analyzes the orientation signal of the user and the accompanying unit for generating the instruction signal to control the accompanying system to perform turning and move.

In one embodiment of the present invention, it discloses that the first pointing unit and the second pointing unit are an angular sensor, a rotary encoder, an inertial sensor, an electronic compass, a gyroscope, a variable resistor, a image processing system or any combination thereof.

In one embodiment of the present invention, the relative position sensing unit is an image processing system, a sonar system, an ultrasonic scanning system, a laser scanning system or any combination thereof.

In another embodiment of the present invention, it discloses that the relative position sensing unit comprises an accompanying angle sensor and a distance sensor, wherein the accompanying angle sensor detects an accompanying angle formed by the accompanying unit and the user and the distance sensor measures a linear distance signal between the accompanying unit and the user, wherein the accompanying angle is an angle formed by a pointing direction of the accompanying angle sensor and a facing direction of the accompanying unit.

In one embodiment of the present invention, it discloses that the distance sensor is an infrared rangefinder, a laser rangefinder, a radio frequency, a string pot displacement sensor, an image processor, an ultrasonic rangefinder or any combination thereof.

In one embodiment of the present invention, it discloses that the accompanying angle sensor is a laser scanner, a radio frequency, an image processing unit, an angle meter, a variable resistor, an electronic compass, a gyroscope, an inertial sensor or any combination thereof.

In order to achieve the above purposes, the present invention discloses an automatic accompanying system, comprising a wearable unit disposed on any part of a user, an accompanying unit, a driving unit, at least one moving element, a control module, and at least one distance sensor; wherein the wearable unit comprises a first tracking unit disposed on the wearable unit, wherein the pointing direction of the first tracking unit and the facing direction of the user form a first angle, and a first angle sensor disposed on the wearable unit for sensing changes in the first angle to obtain a first angle signal; wherein the accompanying unit comprises a second tracking unit disposed on the accompanying unit for tracking and aligning with the first tracking unit, and the first tracking unit is tracking and aligning with the second tracking unit at the same time, wherein the pointing direction of the second tracking unit and the facing direction of the accompanying unit form a second angle, and a second angle sensor disposed on the accompanying unit for sensing changes in the second angle to obtain a second angle signal; wherein the driving unit disposed on the accompanying unit for receiving an instruction signal; wherein the at least one moving element disposed on the accompanying unit and driven by the driving unit to move the accompanying unit to a specific position and perform a corresponding turning action; wherein the control module disposed on the automatic accompanying system for receiving and analyzing at least one signal to generate the instruction signal transmitted to the driven unit; wherein at least one distance sensor disposed on the wearable unit and/or the accompanying unit and interconnected with the first tracking unit and/or the second tracking unit set upon these units for measuring a distance between the wearable unit and the accompanying unit to obtain a distance signal, wherein at least one signal received by the control module comprises the distance signal, the first angle signal and the second angle signal.

In one embodiment of the present invention, it is disclosed that the first tracking unit and the second tracking unit are connected by a strip to form a string pot type directing device, wherein the first tracking unit and the second tracking unit is pulled by the strip to align with each other.

In another embodiment of the present invention, it is disclosed that the at least one distance sensor is an infrared rangefinder, an image processor, a laser rangefinder, a string pot displacement sensor, a ultrasonic rangefinder, a radio frequency or any combination thereof.

In one embodiment of the present invention, it is disclosed that the first angle sensor and the second angle sensor are a laser scanner, an image processing unit, a radio frequency, an electronic compass, a gyroscope, a goniometer, a variable resistor, a rotary encoder, an inertial sensor or any combination thereof.

In one embodiment of the present invention, it is disclosed that the first tracking unit and the second tracking unit are a magnetic attraction device, a heat source following system, an image following system, an optical alignment system or any combination thereof.

In one embodiment of the present invention, it is disclosed that the strip is a retraction wire, a suspension wire, a rope or a multi-core wire.

In order to achieve the above purposes, the present invention also discloses an applied method of an automatic accompanying system, wherein the method uses the said automatic accompanying system to dynamically accompany the user. The method comprises the steps: setting at least one relative position parameter to the control module, and the at least one relative position parameter is used to definite a relative position relationship and an orientation between the accompanying unit and the user; the user starts to move; the at least one sensor of the automatic accompanying system obtains at least one relative position relationship signal and an orientation signal of the user generated by the user's movement and transmits the signals to the control module; the control module analyzes and calculates the signals for generating an instruction signal to control the accompanying unit to move or turn and maintain the relative position relationship and orientation defined by the at least one relative position parameter; repeating the steps of obtaining the signal and steps of analyzing and calculating until the user stops moving or using.

In one embodiment of the present invention, it is disclosed that the at least one relative position parameter is a linear distance between the accompanying unit and the user, an accompanying angle formed by the accompanying unit and the user, a lateral distance between the accompanying unit and the user, a longitudinal distance between the accompanying unit and the user, a difference in the orientation angle of the accompanying unit and the user or any combination thereof.

In another embodiment of the present invention, it is disclosed that the at least one relative position signal comprises an orientation signal of the user, a distance signal, a first angle signal and a second angle signal.

In order to achieve the foregoing purposes, the present invention also discloses another applied method of an automatic accompanying system, comprising the following steps: the control module controls the accompanying unit to automatically follow the user when the user starts to move; the user causes a change in the strip connected between the first tracking unit and the second tracking unit; the sensors obtain the at least one signal generated by the change of the strip caused by the user; the control module analyzes and calculates the at least one signal for generating the instruction signal to control the driving unit to move or turn, so that the accompanying unit is controlled by the user to conduct an accompanying state adjustment.

In one embodiment of the present invention, it is disclosed that the change is a change in length or a change in pointing angle.

In one embodiment of the present invention, it is disclosed that the accompanying state adjustment is a relative position relationship adjustment, a relative angle adjustment, a displacement rate adjustment or an acceleration adjustment.

In one embodiment of the present invention, it is disclosed that the at least one signal comprises a distance signal, a first angle signal and a second angle signal.

In one embodiment of the present invention, it is disclosed that the user can touch the strip to provide the control module a command parameter before the user starts to move, wherein the command parameter adjusts the operating state of the accompanying unit.

In one embodiment of the present invention, it is disclosed that the strip is a multi-core wire, wherein the multi-core wire is conducted with a button or a joystick to generate a signal to adjust the operating state of the accompanying unit or set the mode of the accompanying unit.

In one embodiment of the present invention, it is disclosed that the user can touch the strip to provide the control module a command parameter, wherein the command parameter adjusts the operating state of the accompanying unit.

In one embodiment of the present invention, it is disclosed that the command parameter is a system stop command parameter, a system open command parameter, or an accompanying condition setting command parameter.

DETAILED DESCRIPTION OF THE INVENTION

In order to make the Examiner have a better understanding of the features and the effects achieved in the present invention, the following is preferred embodiments and detailed description.

In the present invention, it is provided that a novel automatic accompanying system effectively detecting user's turning and directly making a corresponding position change, because most of the prior arts only focus on the relative relationship between accompanying unit and user instead of detecting user's turning resulting in insensitive accompany behavior. The automatic accompanying system of the present invention can accompany the user much immediately and effectively rather than following user's displacement trajectory. On the other hand, the automatic accompanying system of the present invention can be adapted to allow the accompanying unit to accompany in front of the user and detect the characteristics of the relative position relationship and user's turning ability at the same time for broadening the applicability.

Therefore, the present invention provides an automatic accompanying system allowing the accompanying unit to follow user based on user's movement and turning action, wherein a first pointing unit detects a facing direction of the user and a relative position sensing unit determines the relative position relationship between the accompanying unit and the user, and then a control module analyzes the signals and controls the accompanying unit to move to a specific position and perform a corresponding turning action for achieving the purposes of detecting the relative position relationship and the facing direction of the user at the same time, thereby improving the accompanying efficiency of the automatic accompanying system.

Based on the above interpretation, the following further describes the elements, properties, combinations and interaction thereof comprised in the accompanying system of the present invention.

Figure 1:
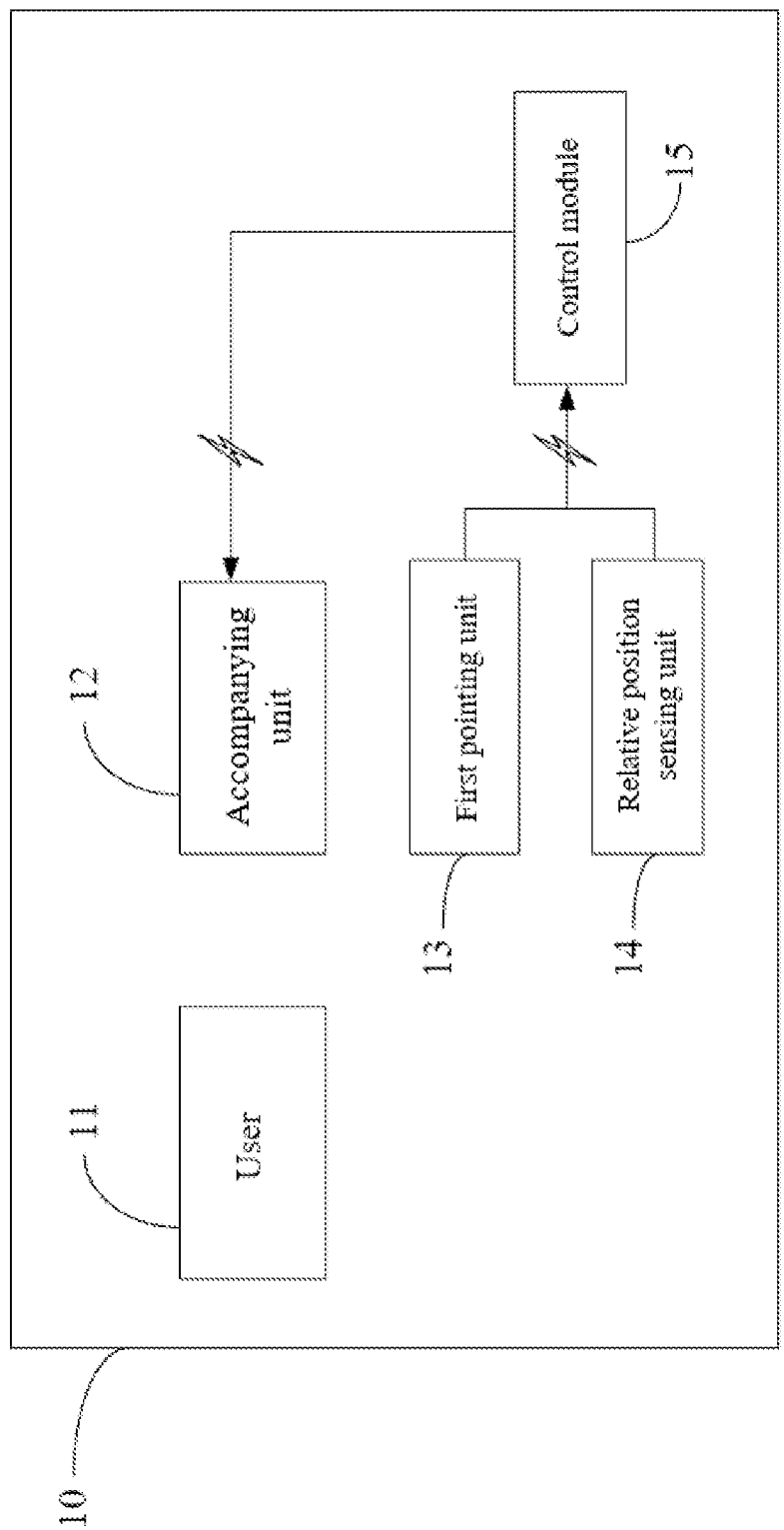
FIG. 1 is a block diagram of elements relationships of an embodiment of the present invention.

Referring to FIG. 1, it is a block diagram of the element relationship of the automatic accompanying system provided by the present invention. As shown in the figure, the automatic accompanying system 10 comprises a user 11 and an accompanying unit 12 for following the user, wherein the accompanying unit 12 follows the user 11 according to the user's movement and turning action and comprises a driving unit 16 and at least one moving element 17. The automatic accompanying system 10 comprises: a first pointing unit 13, a relative position sensing unit 14 and a control module 15, wherein the first pointing unit 13 is disposed on an arbitrary position of the automatic accompanying system 10 for detecting a facing direction of the user and obtaining an orientation signal of the user, the relative position sensing unit 14 is disposed on an arbitrary position of the automatic accompanying system 10 for determining a relative position relationship between the accompanying unit 12 and the user 11 and obtaining a relative position signal, and the control module 15 is disposed on an arbitrary position of the automatic accompanying system 10 for receiving and analyzing the orientation signal of the user and the relative position signal to generate an instruction signal and control the accompanying unit 12 to move to a specific position and make a corresponding turning action.

Wherein, the orientation signal of the user is a signal relating to a facing direction of the user or a torso orientation when the user 11 in a stationary state or a moving state. After the automatic accompanying system 10 sets the orientation relationship between the user 11 and the accompanying unit 12, the accompanying unit 12 will follow the set orientation relationship to operate corresponding movement and turning action no matter where the user 11 faces toward. Even if the user 11 only rotates in place and changes the orientation relationship between them, the accompanying unit 12 will still operate corresponding movement and turning action according to the set orientation relationship. Based on the above, the first pointing unit 13 provided by the accompanying system 10 can be disposed on an arbitrary position of the automatic accompanying system 10, including on the user 11 or the accompanying unit 12. When the first pointing unit 13 is disposed on the user 11, it can directly sense the facing direction or the torso orientation of the user; and when it is disposed on the accompanying unit 12, it can obtain the orientation signal of the user 11 from the accompanying unit 12.

Figure 2C:
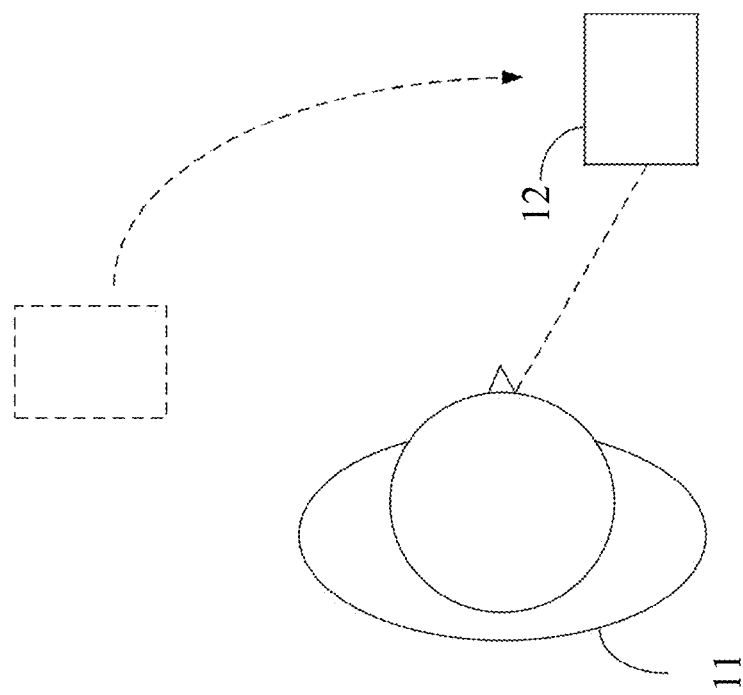
FIG. 2A-2C are schematic diagrams of orientation angles of an embodiment of the present invention.
Figure 2B:
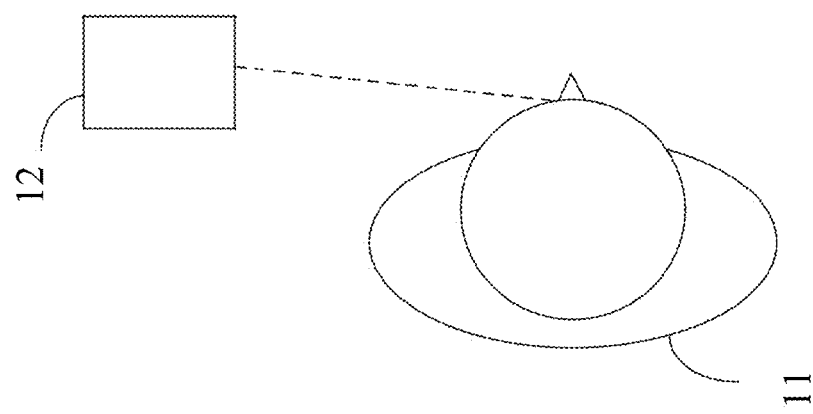
Figure 2A:
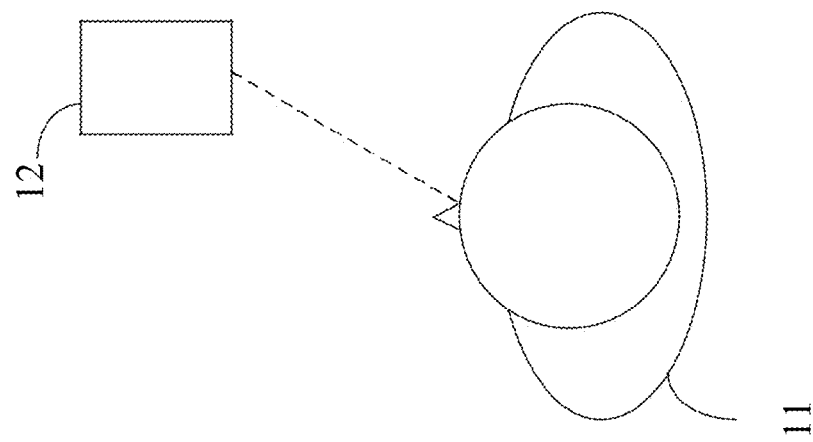

For example, referring to FIG. 2A-2C, schematic diagrams of the orientation angle of the automatic accompanying system provided by the present invention. As shown in the figure, it is assumed that the automatic accompanying system 10 locates the accompanying unit 12 at forward right of the user 11. When the user 11 turns right in situ causing the orientation relationship between accompanying unit 12 and the user 11 to become forward left, the first pointing unit 13 will sense the chance and control the driving unit 16 to drive the accompanying unit 12 to re-locate at forward right of the user 11 as set to maintain the orientation between them. As a result, the automatic accompanying system 10 makes the accompanying unit 12 move correspondingly to the turning action of the user 11 in time by detecting and analyzing the orientation signal of the user.

Figure 3:
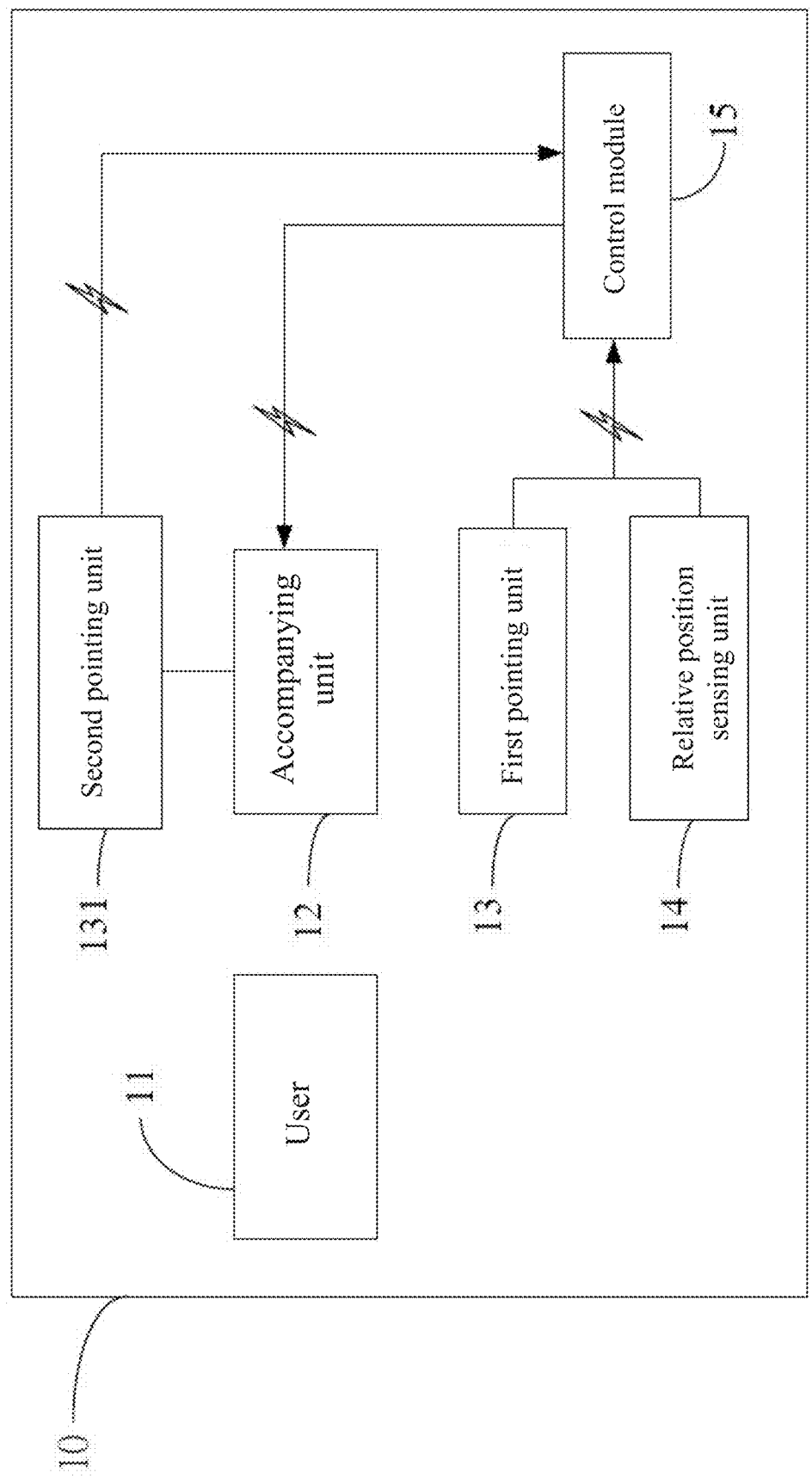
FIG. 3 is a block diagram of elements relationships of an embodiment of the present invention.

Please referring to FIG. 3, a block diagram of the element relationship in the automatic accompanying system 10 of a preferred embodiment provided by the present invention. As shown in the figure, the automatic accompanying system 10 further comprises a second pointing unit 131, disposed on the accompanying unit 12, for determining and detecting the facing direction of the accompanying unit 12 to obtain an orientation signal of the accompanying unit, wherein the facing direction of the accompanying unit 12 is the direction that the Y-axis extends forward in a customized three-dimensional local coordinate system (LCS) where the accompanying unit 12 considered as a center.

When the automatic accompanying system detects the orientation signal of the user 11 and the accompanying unit 12 by the first pointing unit 13 and the second pointing unit 131, the automatic accompanying system 10 will transmit these two orientation signals to the control module 15 for analyzing a difference between them and comparing them to an orientation angle difference value preset in the automatic accompanying system 10 to determine the turning action of the user 11. After the determining process, it will send an instruction signal to control the accompanying unit 12 to make a corresponding movement and turning action.

For example, referring to FIG. 2A-2C, the automatic accompanying system 10 presets the facing direction of the user 11 is the same as the facing direction of the accompanying unit 12, meaning that the difference between the two orientation angles is 0. When the user 11 turns 90 degrees to the right in situ, the first pointing unit 13 will sense the orientation signal of the user 11 becoming positive 90 degrees and the second pointing unit 131 will sense the orientation signal of the accompanying unit 12 is 0 degree. And the control module 15 receives these two orientation signals transmitted by the first pointing unit 13 and the second pointing unit 131 and analyzes the difference in these orientation angles to compare it with the preset orientation angle. If it is minus 90 degrees different, an instruction signal will be provided to request the accompanying unit 12 to make a corresponding movement and turning for maintaining the difference in these two orientation angles as same as the preset difference value in orientation angles.

Based on the foregoing, the first pointing unit 13 and the second pointing unit 131 of the present invention are an antometer, a variable resistor, a rotary encoder, an inertial sensor, a gyroscope, an electronic compass or any combination thereof.

In the automatic accompanying system 10 provided by the present invention, a relative position sensing unit 14 is also provided for sensing a relative position relationship signal. The relative position relationship signal, relevant information of the position correspondence relationship between the user 11 and the accompanying unit 12 whether the user 11 is in stationary state or a moving state, comprises, but is not limited to, the lateral distance between the accompanying unit 12 and the user 11, the longitudinal distance between the accompanying unit 12 and the user 11, the vertical height distance between the accompanying unit 12 and the user 11 and the linear distance between the accompanying unit 12 and the user 11.

When the user 11 is moving, the relative position sensing unit 14 in the automatic accompanying system 10 can simultaneously observe the difference in lateral distance between the accompanying unit 12 and the user 11, the difference in longitudinal distance between the accompanying unit 12 and the user 11, the difference in vertical height distance between the accompanying unit 12 and difference in the user 11 and the linear distance between the accompanying unit 12 and the user 11 and turn the change amount of those distance differences into the relative position relationship signal. The relative position relationship signal is transmitted to the control module 15 for analyzing, and a command is further generated to request the accompanying unit 12 to make a corresponding movement and turning.

In a preferred embodiment of the present invention, the longitudinal distance change, the lateral distance change, the vertical height distance change and the linear distance change between the accompanying unit 12 and the user 11 can be directly obtained by an image processing system through the capture and analysis of the image. When one of the sensing target in the image is moving causing a change in relative position, the image processing system can immediately monitor the change in the longitudinal distance, the lateral distance and the vertical height distance between the accompanying unit 12 and the user 11. There is no limitation to the setting position of the image processing unit. When the image processing system is disposed on the user 11 side, it means that the sensing target in the image is the accompanying unit 12. Hence, the determination of the relative position relationship signal is based on the user 11 is approaching to or moving away from the accompanying unit 12. On the contrary, if the image processing unit is disposed on the accompanying unit 12 side, it suggests that the sensing target in the image is the user 11. Therefore, it is determined by the perspective of the accompanying unit 12 that the user 11 is moving away from or approaching to.

In another preferred embodiment of the present invention, the longitudinal distance change, the lateral distance change, the vertical height distance change and the linear distance change between the accompanying unit 12 and the user 11 can be obtained by a combination of an angular sensor and a distance sensor. Through the combination of an angular sensor and a distance sensor, the longitudinal distance change, the lateral distance change, the vertical height distance change and the linear distance change between the accompanying unit 12 and the user 11 can be turned into an accompanying angle signal and a linear distance signal, which can be calculated to get the longitudinal distance change, the lateral distance change and the vertical height distance between the accompanying unit 12 and the user 11; wherein the linear distance signal is the linear distance between the accompanying unit 12 and the user 11 and the accompanying angle signal is an angle value of the accompanying angle formed by the pointing direction of the accompanying angle sensor and the facing direction of the element that the accompanying angle sensor is disposed on, meaning that if the accompanying angle sensor is disposed on the user 11, the accompanying angle signal is the angle value of an accompanying angle formed by the pointing direction of the accompanying angle sensor and the facing direction of the user 11; on the contrary, if the accompanying angle sensor is disposed on the accompanying unit 12, the accompanying angle signal is the angle value of an accompanying angle formed by the pointing direction of the accompanying angle sensor and the facing direction of the accompanying unit 12. After the automatic accompanying system 10 measures the accompanying angle signal and the linear distance signal and transmits the signals to the control module 15, the control module 15 can obtain the longitudinal distance, the lateral distance and the vertical height distance between the accompanying unit 12 and the user 11 by geometric operation, such as a trigonometric function operation. Therefore, the purpose of observing the relative position relationship between the two can be achiever, and a further command is generated to request the accompanying unit 12 to make a corresponding movement and turning.

The accompanying angle sensor continuously points to its corresponding target, forming a pointing direction of the accompanying angle sensor, and the target of the accompanying angle sensor varies depending on where it is disposed on. If the accompanying angle sensor is disposed on the user 11, the pointed corresponding target is the accompanying unit 12; and if the accompanying angle sensor is disposed on the accompanying unit 12, the pointed corresponding target is the user 11. And the facing direction of the accompanying unit 12 is the direction that the Y-axis extends forward in a customized three-dimensional local coordinate system (LCS) where the accompanying unit 12 considered as a center. Therefore, according to the foregoing definitions, the accompanying angle formed by the pointing direction of accompanying angel sensor and the facing direction of the accompanying unit 12 relating to the longitudinal distance, the lateral distance and the vertical height distance between the accompanying unit 12 and the user 11 directly, so that the automatic accompanying system 10 can obtain the accompanying angle signal and the linear distance signal to determine the basis of the change in the relative position relationship between the user 11 and the accompanying unit 12.

Based on the foregoing, the accompanying angle sensor is a laser scanner, a radio frequency, an image processing unit, an angle meter, a variable resistor, an electronic compass, a gyroscope, an inertial sensor or any combination thereof; and the distance sensor is an infrared rangefinder, a laser rangefinder, a radio frequency, a string pot displacement sensor, an image processor, an ultrasonic rangefinder or any combination thereof.

In the automatic accompanying system 10 provided by the present invention, a control module 15 is provided to perform the aforementioned reception and analysis of the sensing signal, and an instruction signal is generated based on the results of analysis to control the accompanying unit 12 to move to a specific position and make a corresponding turning action. Based on the foregoing, the control module 15 provided by the present invention can be disposed on any position of the automatic accompanying system 10 and communicating connected to the first pointing unit 13, the second pointing unit 131 and the relative position sensing unit 14 of the automatic accompanying system 10 by wired or wireless transmission. The control module 15 obtains and analyzes the orientation signal of the user 11 and the relative position relationship signal of the accompanying unit 12 form these sensor elements for calculating the movement and turning information needed for the accompanying unit 12 to move correspondingly with the user's 11 movement. Namely, the control module 15 provides the instruction signal to control the accompanying unit 12 to move to a specific position and make a correspondingly turning action.

Figure 4:
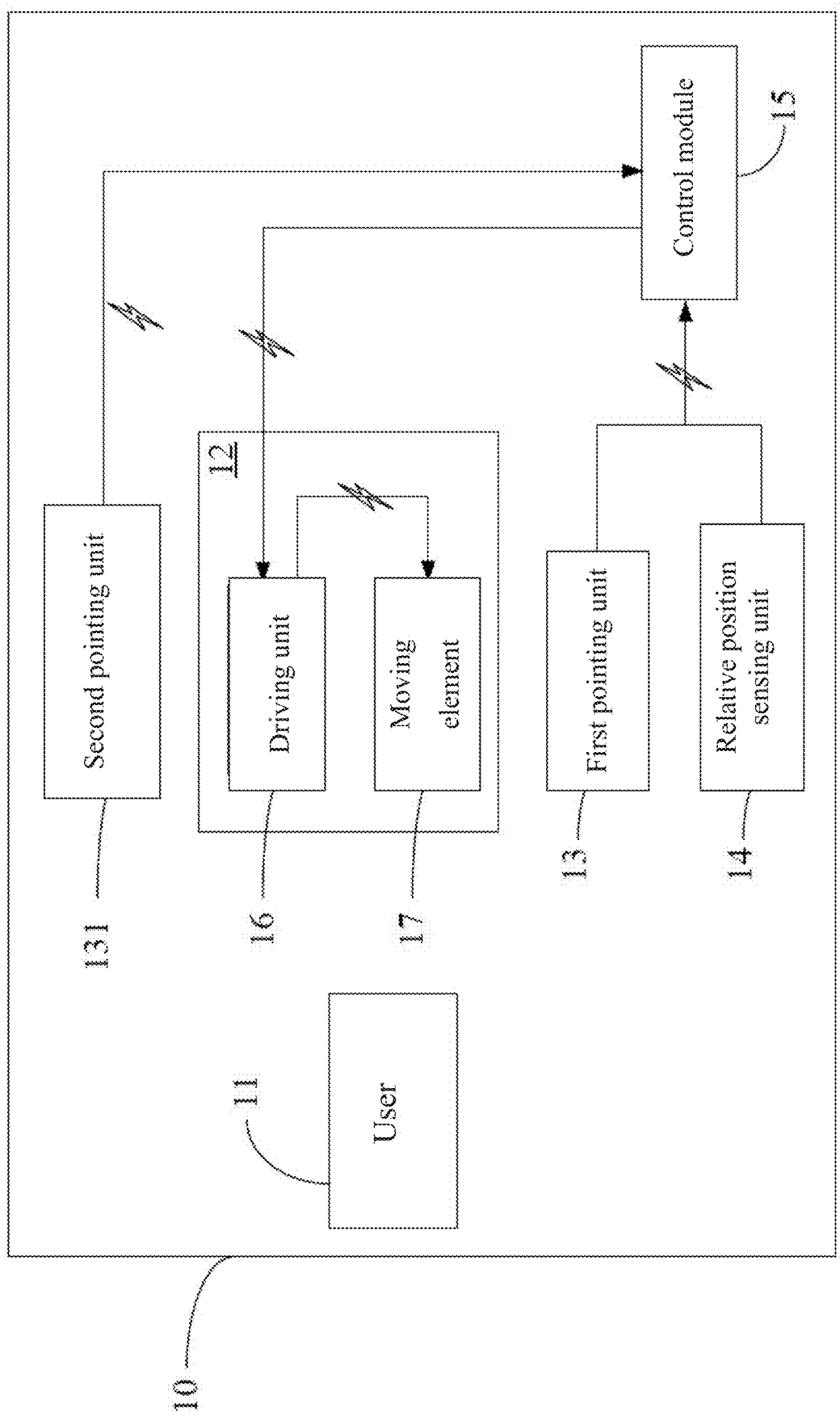
FIG. 4 is a block diagram of elements relationships of an embodiment of the present invention.

Finally, please refer to FIG. 4, a block diagram of the element relationship of the automatic accompanying system 10 in a preferred embodiment of the present invention. The accompanying unit 12 further comprises a driving unit 16 and a moving element 17, wherein the driving unit 16 receives the instruction signal from the control module 15 and drives the moving element 17 to move and make a corresponding turning action for maintaining the relative position relationship between the accompanying unit 12 and the user 11; wherein the moving element 17 is an omnidirectional wheel set, a mecanum wheel set or an aerodynamic device in order to make the accompanying unit 12 accompany the user 11 in a more efficient way and reduce the route to improve the displacement efficiency of the accompanying unit 12, so that the accompanying unit 12 can move in a multi-axial way.

In addition to the above content, the present invention also provides another type of automatic accompanying system, which also observes the linear distance and the accompanying angle between the accompanying unit 12 and the user 11 to determine the relative position relationship between them and carry out the accompanying. The following describes the elements, properties, combinations and interaction thereof comprised in the other type of the accompanying system.

Figure 5A:
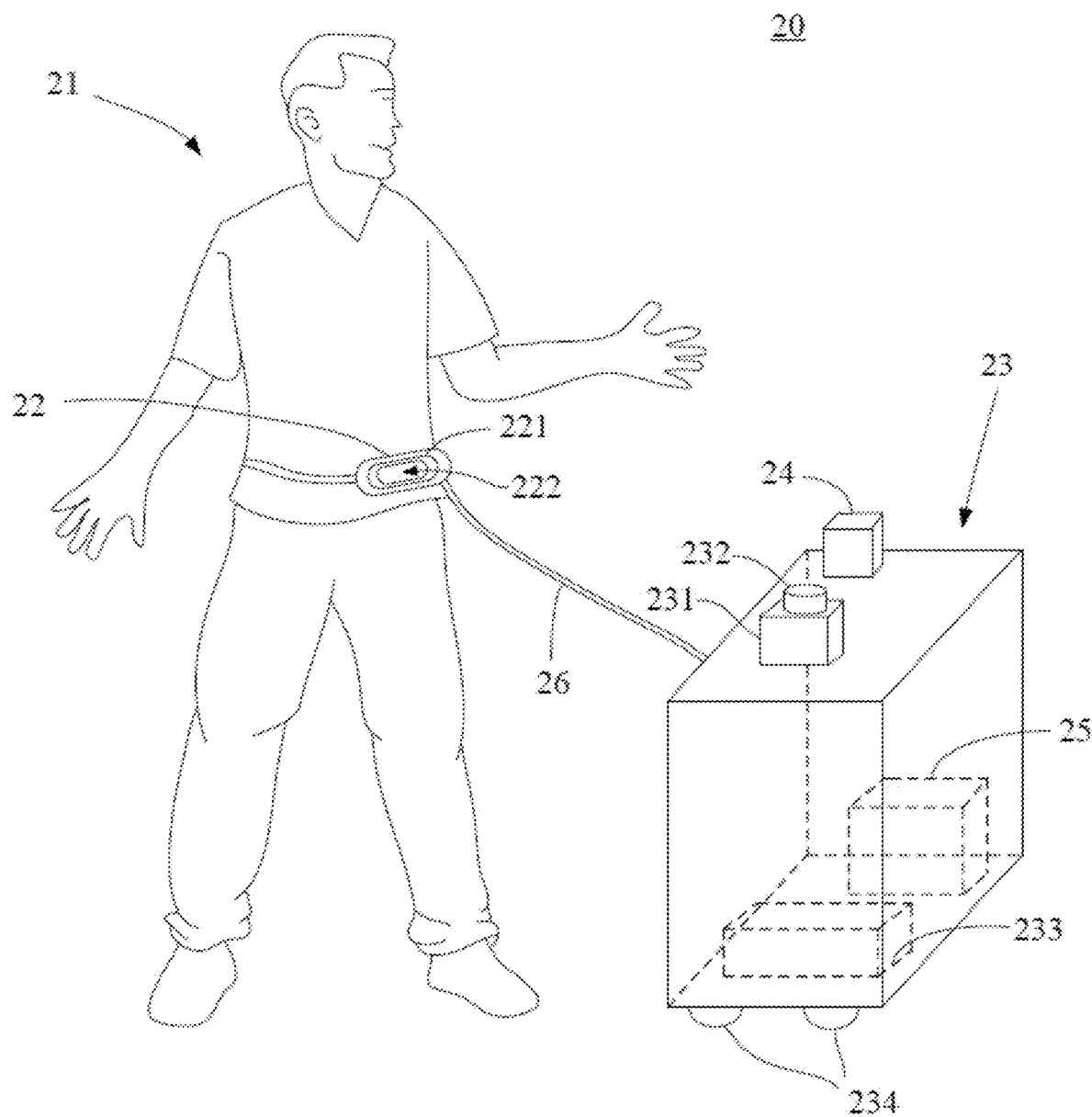
FIG. 5A is a side view of an embodiment of the present invention.
Figure 5B:
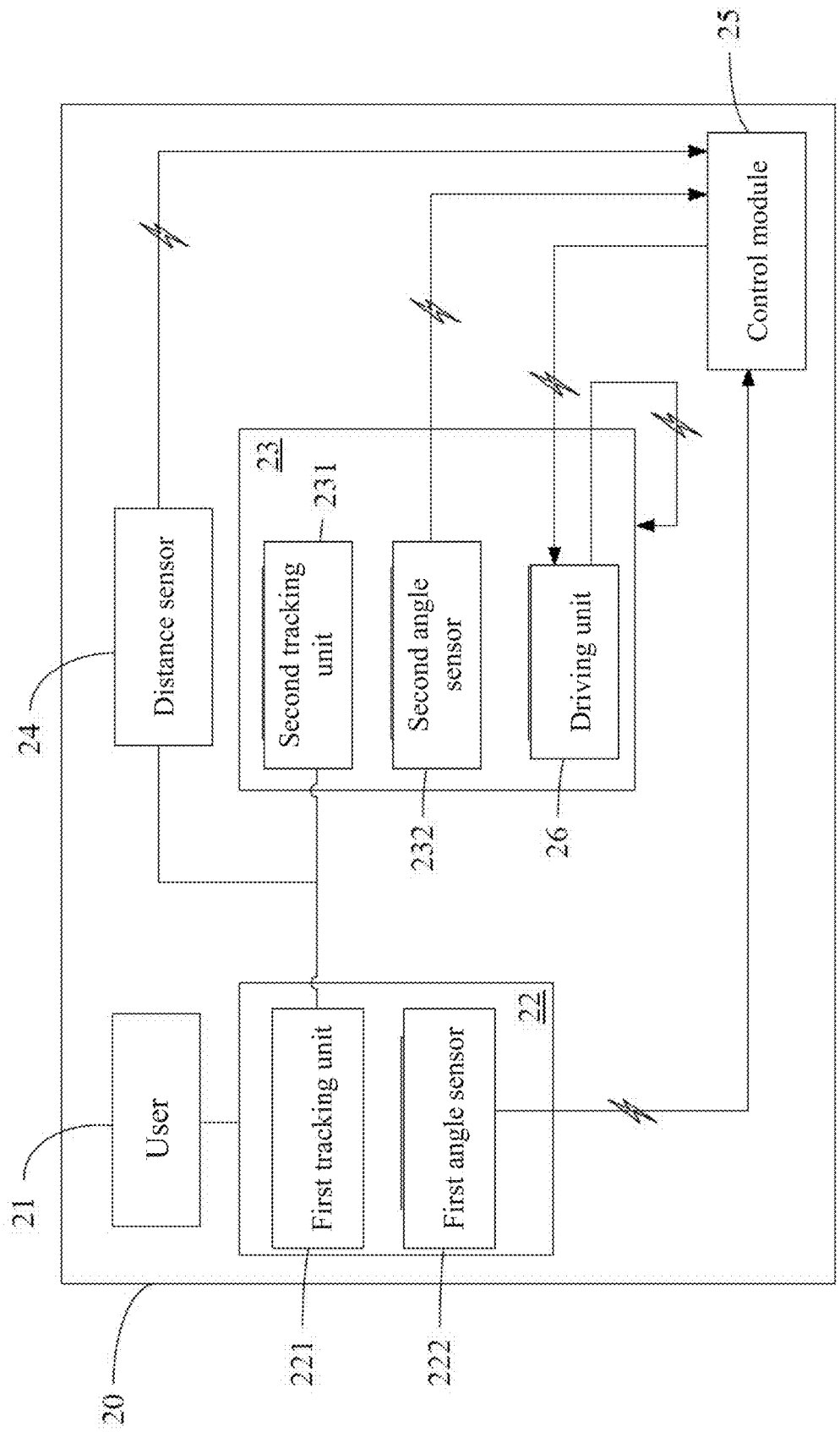
FIG. 5B is a block diagram of elements relationships of an embodiment of the present invention.
Figure 6B:
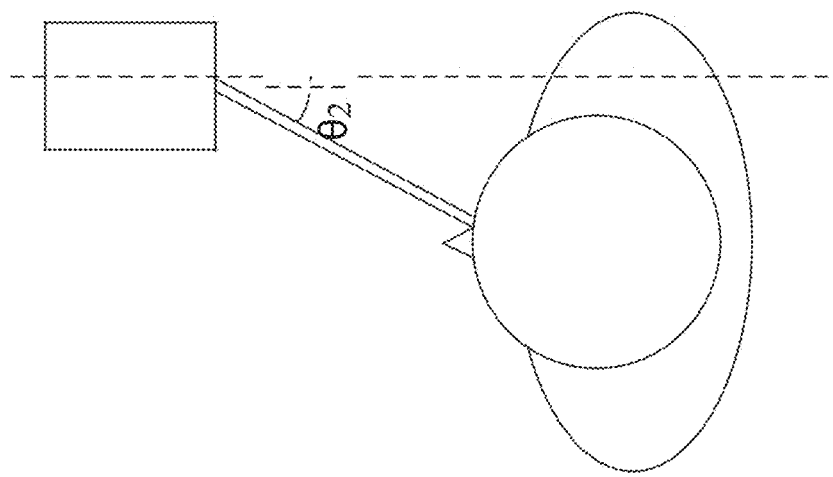
FIG. 6A-6B are schematic diagrams of pointing angles and orientation angles of one embodiment of the present invention.
Figure 6A:
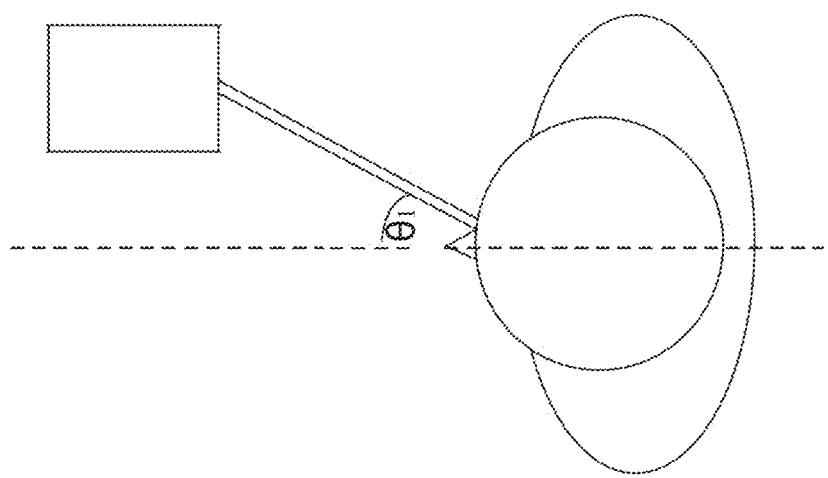

Please refer to FIGS. 5A and 5B, a side view and a element relationship block diagram of a preferred embodiment of another automatic accompanying system 20. As shown in the figure, the automatic accompanying system 20 comprises a wearable unit 22, an accompanying unit 23, at least one distance sensor 24 and a control module 25, wherein the wearable unit 22 is disposed on an arbitrary position of the user 21 and comprises a first tracking unit 221 and a first angle sensor 222; wherein the pointing direction of the first tracking unit 221 forms a first angle (θ1 in FIG. 6A) with the facing direction of the user 21, and the first angle sensor 222 is configured to sense a change in the first angle to obtain a first angel signal. On the other hand, the accompanying unit 23 is equipped with a second tracking unit 231 and a second angle sensor 232, wherein the second tracking unit 231 is used to track and align with the first tracking unit 221 and the first tracking unit 221 also tracks and aligns with the second tracking unit 231; wherein the pointing direction of the second tracking unit 231 forms a second angle (θ2 in FIG. 6B) with the facing direction of the accompanying unit, and the second angle sensor 232 is configured to sense a change in the second angle to obtain a second angel signal. The accompanying unit is provided with a driving unit 233 and at least one moving element 234, wherein the driving unit 233 receives an instruction signal and drives the at least one moving element 234 to move the accompanying unit 23 to a specific position and make a corresponding turning. The at least one distance sensor 24 disposed on the automatic accompanying system 20 is used to measure the distance between the wearable unit 22 and the accompanying unit 23 as a distance signal. Therefore, it can be separately disposed on the wearable unit 22 or the accompanying unit 23, or it can be arranged on the wearing unit 22 and the accompanying unit 23 at the same time for comparing with each other to reduce errors. On the other hand, in order to measure the linear distance between the wearable unit 22 and the accompanying unit 23 accurately, the at least one distance sensor 24 is configured to link with the first tracking unit 221 and/or the second tracking unit 231 for ensuring that the linear distance between the wearable unit 22 and the accompanying unit 23 is accurately measured. Finally, the automatic accompanying system 20 is also provided with a control module 25. The control module 25 is communicating connected to the first angle sensor 222, the second angle sensor 232 and the at least one distance sensor 24 of the automatic accompanying system 20 in wired or wireless transmission. The control module 25 obtains and analyzes the relative position relationship signal of the user 21 and the accompanying unit 23 form these sensor elements for calculating the movement and turning information needed for the accompanying unit 23 to move correspondingly with the user's 21 movement. Namely, the control module 25 provides the instruction signal to control the accompanying unit 23 to move to a specific position and make a correspondingly turning action.

The first tracking unit 221 and the second tracking unit 231 are respectively disposed on the wearing unit 22 and the accompanying unit 23 and tracking a target in a three-dimensional axial rotation way. For the first tracking unit 221, the corresponding tracking target is the accompanying unit 23 or the second tracking unit 231 located on the accompanying unit 23; conversely, the tracking target of the second tracking unit 231 is the wearable unit 22 or the first tracking unit 221 on the wearable unit 22. Based on their tracking characteristics, when the user 21 is stationary, these two tracking units are opposite to each other and the pointing direction of each of them forms an accompanying angle with the facing direction of the user 21 and the facing direction of the accompanying unit 23, which is the first angle (as shown as θ1 in FIG. 6A) and the second angle (as shown as θ2 in FIG. 6B) respectively.

Continuing the content of the previous paragraph, in a preferred embodiment provided by the present invention, in order to allow the first tracking unit 221 and the second tracking unit 231 to change the relative positions with the tracking target and track the target accurately, these two tracking units can be provided with a traction in a contact or non-contact way to track, wherein the traction in a contact way can be operated by using a strip 26 to connect with the first tracking unit 221 and the second tracking unit 231 to form a string pot pointing device. When the relative position of the user 21 or the accompanying unit 23 is changed, the first tracking unit 231 and the second tracking unit 231 will receive a tractive force of the strip 26 and rotate, so that these two tracking units can continuously track and align with the tracking target to provide a real-time reference data of the corresponding relationship between the user 21 and the accompanying unit 23.

In a preferred embodiment of the present invention, the strip 26 can be provided in different forms to enhance the function of the automatic accompanying system 200. For example, the strip 26 is a material with a telescopic function, so that the tractive force between the two tracking units is increased to improve tracking accuracy; alternatively, in another preferred embodiment, the strip 26 is a catenary system, resulting in measuring the distance between these two tracking units when the strip 26 is dragging these two tracking units to operate tracking and accompanying. Also, in another preferred embodiment, the strip 26 is a multi-core wire, so that any sensing signal in the automatic accompanying system 20 needed to be transmitted can pass through the wire for efficient transmission. Furthermore, in order to let the user 21 give instruction to the automatic accompanying system 20 though the strip 26, the multi-core wire can further be provided with buttons, joysticks or any other forms to affect the transmission of information on the wire. Therefore, the strip 26 provided by the present invention is a retraction wire, a catenary, a rope or a multi-core wire.

In a preferred embodiment of the present invention, the first tracking unit 221 and the second tracking unit 231 can track in a non-contact way. Namely, these two tracking units can be driven by a sufficient force at a distance to turn and track when the relative position between the user 21 and the accompanying unit 23 is changed, wherein the force at a distance is, but not limited to, a magnetic force. The tracking units can sense physiological characteristics of tracking target or an additional tracking feature and drive the turning mechanism of the accompanying unit to accompany; wherein the the physiological characteristics of tracking target can be exemplified, but not limited to, a dynamic activity characteristic of the user 21, a thermal induction of the user 21 or other physiological sensing targets, and the additional tracking feature can be exemplified, but not limited to, a light source emitter, a heat source emitter or other tracking feature provided on another tracking unit. Therefore, the first tracking unit and the second tracking unit is a magnetic attraction device, a heat source following system, an image following system or an optical alignment system. However, the protection scope of the present invention is not limited thereto, and anyone who has the same purpose and technical means as the concept of the present invention should be limited by the scope of the present invention.

As described above, the two tracking units in the automatic accompanying system 20 provided by the present invention are opposite to each other, and the pointing directions of them respectively have an accompanying angle with the facing direction of the user 21 and the facing direction of the accompanying unit 23 as the first angle and the second angle. When the user 21 moves, or when the relative position relationship between the user 21 and the accompanying unit 23 changes, the first tracking unit 221 on the wearable unit 22 and the second tracking unit 231 on the accompanying unit 23 continuously track to each other to maintain the face-to-face relationship between two tracking units. At the same time, it causes changes in the first angle and the second angle formed by the pointing directions of these two tracking units and the facing direction of the user 21 and the facing direction of the accompanying unit 23 respectively. The changes in these two angles are measured by the first angle sensor 222 and the second angle sensor 232 to obtain a first angle signal and the second angle signal, transmitted to the control module 25. Therefore, the first angle sensor 222 and the second angle sensor 232 are a laser scanner, an image processing unit, a radio frequency, a goniometer, a rotary encoder, an inertial sensor, an electronic compass, a gyroscope or any combination thereof.

In the automatic accompanying system 20 of the present invention, at least one distance sensor 24 is provided for measuring the distance between the wearable unit 22 and the accompanying unit 23 to obtain a distance signal. In order to measure the distance between two units instantly, the at least one distance sensor 24 is linked with the first tracking unit 221 and/or the second tracking unit 231 and the direction of sensing is as same as the pointing directions of two tracking units. Therefore, when the relative position between the user 21 and the accompanying unit 23 changes, the three-dimensional axial rotation of the first tracking unit 221 and the second tracking unit 231 will drive the at least one distance sensor 24 to rotate as well, so that the linear distance between the user 21 and the accompanying unit 23 can be accurately measured at any time point. Based on the foregoing, the at least one distance sensor 24 is an infrared rangefinder, an image processor, a laser rangefinder, a radio frequency, a string pot displacement sensor, a ultrasonic rangefinder or any combination thereof.

In the automatic accompanying system 20 of the present invention, the accompanying unit 23 provides a driving unit 233 and a moving element 234, wherein the driving unit 233 receives the instruction signal from the control module 25 and drives the moving element 234 to make a movement and a corresponding truning action according to the information of instruction signal for maintaining the relative position relationship and the relative orientation relationship between the accompanying unit 23 and the user 21, wherein the moving element 234 is an omnidirectional wheel set, a mecanum wheel set or an aerodynamic device in order to make the accompanying unit 23 accompany the user 21 in a more efficient way and reduce the route to improve the displacement efficiency of the accompanying unit 23, so that the accompanying unit 23 can move in a multi-axial way.

In the automatic accompanying system 20 provided by the present invention, a control module 25 is provided to perform the aforementioned reception and analysis of the sensing signal and generates an instruction signal by the results of analysis to control the accompanying unit 23 to move to a specific position and make a corresponding turning action. Based on the foregoing, the control module 25 provided by the present invention can be disposed on any position of the automatic accompanying system 20 and communicating connected to the first angle sensor 222, the second angle sensor 232 and the at least one distance sensor 24 of the automatic accompanying system 20 in wired or wireless transmission. The control module 25 obtains and analyzes the linear distance signal of the user 21 and the accompanying angle signal with the accompanying unit 23 (meaning the first signal and the second signal) from these sensor elements for calculating the movement and turning information needed for the accompanying unit 23 to move correspondingly with the user's 21 movement.

The following further describes the elements, device properties and operation ways used in the applicational method of the automatic accompanying system of the present invention.

Figure 7:
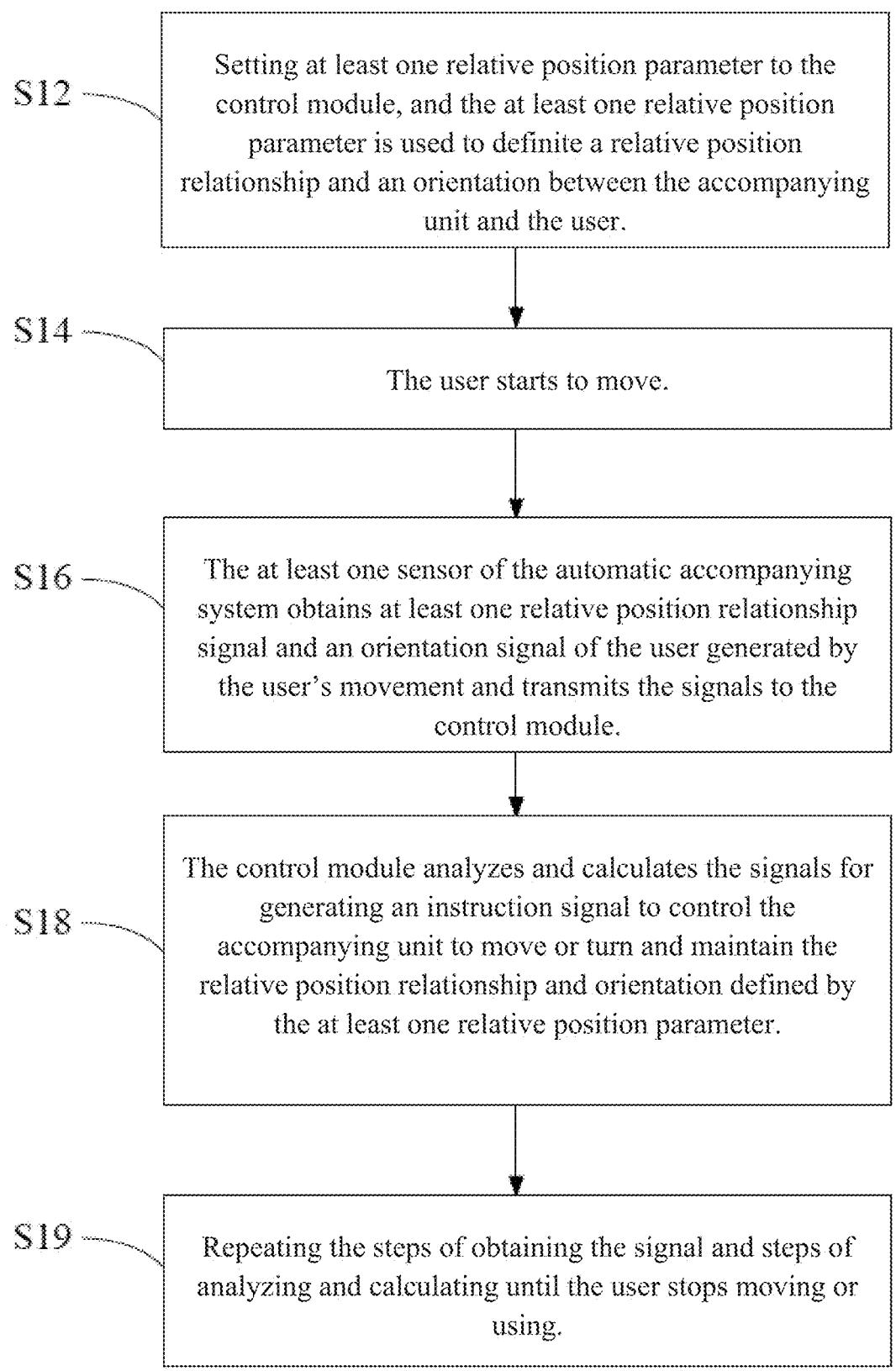
FIG. 7 is a flowchart of a method of one embodiment of the present invention.

Please refer to FIG. 7, a method of one embodiment of the present invention. As shown in the figure, the applied method comprises the steps:

Step S12: setting at least one relative position parameter to the control module, and the at least one relative position parameter is used to definite a relative position relationship and orientation between the accompanying unit and the user;

Step S14: the user starts to move;

Step S16: the at least one sensor of the automatic accompanying system obtains at least one relative position relationship signal and an orientation signal of the user generated by the user's movement and transmits the signals to the control module;

Step S18: the control module analyzes and calculates the signal for generating an instruction signal to control the accompanying unit to move or turn and maintain the relative position relationship and orientation defined by the at least one relative position parameter; and Step 19: repeating the steps of obtaining the signal and step of analyzing and calculating until the user stops moving or using.

As shown in step S12, in the applied method of the automatic accompanying system in this embodiment, at least one relative position parameter is set to the control module, so that the control module can drive the accompanying unit to move to a relative position corresponding to the preset relative position parameter for standby, and keep the relative position corresponding to the preset relative position parameter to accompany during the user's moving process. The set content should at least comprise the relative orientation and the relative position relationship between the user and the accompanying system, wherein the relative orientation is an angle difference between the facing direction of the user and the facing direction of the accompanying system. For example, when the relative orientation between the user and the accompanying unit is set as 0 degree in advance, it means that the user and the accompanying unit should face the same direction during the movement. On the other hand, the relative position relationship refers to a relative relationship obtained from a comprehensive evaluation of the longitudinal distance and the lateral distance between the user and the accompanying unit. Based on the foregoing, the at least one relative position parameter provided by the present invention is the linear distance between the accompanying unit and the user, the lateral distance between the accompanying unit and the user, the longitudinal distance between the accompanying unit and the user, the vertical height distance between the accompanying unit and the user, the accompanying angle between the accompanying unit and the user or any combination thereof.

As shown in steps S14 and S16, when the user starts to move, the relative position relationship or the relative orientation between the user and the accompanying unit is changed. At this time, the sensor of the automatic accompanying system, comprising, but not limited to, the first pointing unit, the relative position sensing unit, the second pointing unit, the accompanying angle sensor, the first angle sensor, the second angle sensor, the at least one distance sensor or any combination thereof, senses the relative position relationship between the user and the accompanying unit to obtain at least one relative position signal and an orientation signal of the user generated by the user's movement and transmitted to the control module, wherein the at least one relative position relationship signal comprises, but is not limited to, a linear distance signal, an accompanying angle signal, a first angle signal or a second angle signal.

As described in the step S18, the control module receives at least one relative position signal and an orientation signal of the user generated by the user's movement and obtained by the sensors, and then combines and calculates these signals to obtain the relative position relationship between the accompanying unit and the user after user's movement, wherein the relative position relationship comprises, but is not limited to, the linear distance between the accompanying unit and the user, the lateral distance between the accompanying unit and the user, the longitudinal distance between the accompanying unit and the user, the vertical height distance between the accompanying unit and the user, the accompanying angle between the accompanying unit and the user. For example, after receiving the linear distance signal and the first angle signal, the control module can calculate by geometric operations, such as the trigonometric functions, to obtain the lateral and longitudinal distance relationship between the user and the accompanying unit after the user's movement. Through the results of the lateral distance relationship, the longitudinal distance relationship, the linear distance relationship and the first angle signal as references, the current location of the accompanying unit locates on which position of the user can be clearly defined. And then comparing the determination results with the preset relative position parameter, the difference between the currently relative position of the accompanying unit and the preset value is calculated and an instruction signal is generated for the accompanying unit to give a feedback, so that the accompanying unit moves to the preset relative position for resetting, so as to continuously follow the user's movement.

As shown in step S19, the automatic accompanying system provided by the present invention repeats steps S14 to S18 to make the accompanying unit accompany the user uninterruptedly during the user's movement for providing a highly sensitive and secure automatic accompanying system.

Figure 8:
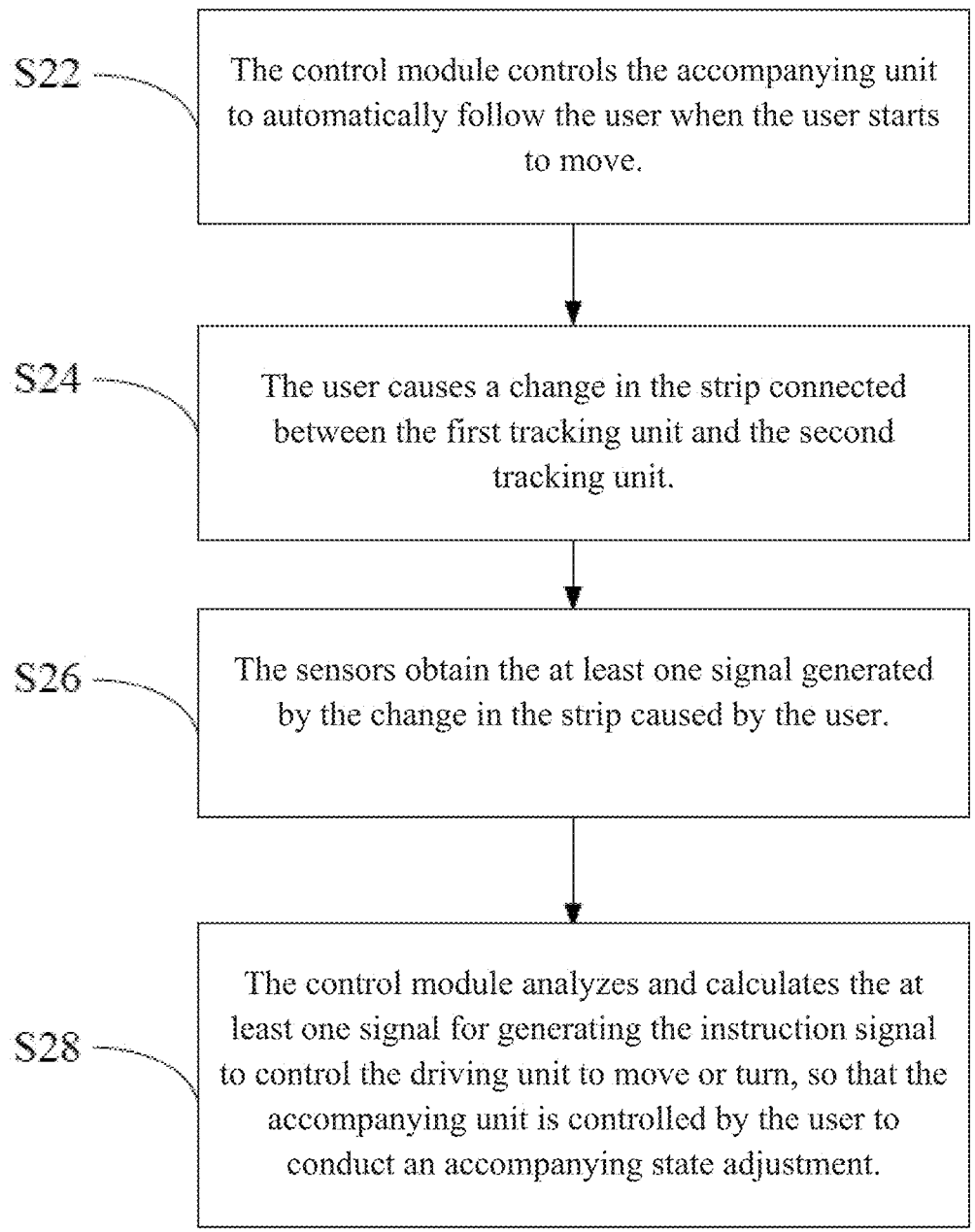
FIG. 8 is a flowchart of a method of one embodiment of the present invention.

Hereinafter, referring to FIG. 8, a method flowchart of an automatic accompanying system application method according to an embodiment of the present invention, an embodiment with a strip set between the user and the accompanying unit. The strip is set with induction device for the user to operate and control the automatic accompanying system through the strip. As shown in the figure, the method comprises the following steps:

Step S22: the control module controls the accompanying unit to automatically follow the user when the user starts to move;

Step S24: the user causes a change in the strip connected between the first tracking unit and the second tracking unit;

Step S26: the sensors obtain the at least one signal generated by the change in the strip caused by the user; and Step S28: the control module analyzes and calculates the at least one signal for generating the instruction signal to control the driving unit to move or turn, so that the accompanying unit is controlled by the user to conduct an accompanying state adjustment.

As shown in step S22, the method provided by the present invention for controlling the accompanying state of the accompanying unit by a strip can be applied to a case that the accompanying unit is synchronized to accompany with the user's accompanying state, wherein the way to acquire signal from the user, the type of the acquired signal, the way to process signal and the way to generate instruction signal of the accompanying unit are as same as the content described in steps S12 to S18 and will not be repeated here.

As shown in Steps S24 and S26, in the method of using a strip to control accompanying unit and accompanying state provided by the present invention, the user can make a change in the strip connected between the first tracking unit and the second tracking unit, wherein the change is caused by the user's movement state or manually changing location of the first tracking unit or the strip. After the sensors disposed on the automatic accompanying system obtain at least one signal generated by the user changing the strip, the signals are transmitted to the control module for generating back-end feedback to control the accompanying state of the accompanying unit; wherein the change generated by the strip comprises, but is not limited to, a change in length or a change in pointing angle, and the signals, the automatic accompanying system obtains after sensing the change in length or in pointing angle of the strip, comprise, but is not limited to, a distance signal, a first angle signal and a second angle signal.

For instance, if the user wants to move the accompanying unit to the left of the user, the user can shift the pointing angle of the strip to the left. As a result, the first angle signal obtained by the first angle sensor of the automatic accompanying system will be changed, and the changed first angle signal is transmitted to the control module for subsequent signal processing. Once the user's movement is determined as the user shifts to the left, an instruction signal is generated to drive the accompanying unit to move to the left of the user correspondingly.

As shown in step S28, in the method of using a strip to control accompanying unit and accompanying state provided by the present invention, after the control module receives the changes in the signals obtained from the sensing elements of the automatic accompanying system, a geometric operation, such as trigonometric function, is conducted to calculate the angle relationship and the linear distance between the changed accompanying unit and the user. Through the calculation, the lateral distance relationship and the longitudinal distance relationship between the user and the accompanying corresponding to the change in the strip can be obtained, and the relative position relationship between the user and the accompanying unit corresponding to the change in the strip can be clearly defined. The control module will compare the results to the preset relative position parameter and confirm the difference between the currently relative position of the accompanying unit and the preset value to generate an instruction signal as a feedback for the accompanying unit, so that the accompanying unit moves to the preset relative position and makes a corresponding turning action, so as to achieve the purpose of using change of the strip to control the automatic accompanying system; wherein the accompanying state comprises, but is not limited to, a relative position relationship adjustment, a linear distance adjustment and a moving speed adjustment.

The automatic accompanying system provided by the present invention can repeat the steps S24 to S28 to provide a convenience automatic accompanying system with intact functions, so that the user can control the accompanying unit at an appropriate time during the continuous accompany of the accompanying unit.

Figure 9:
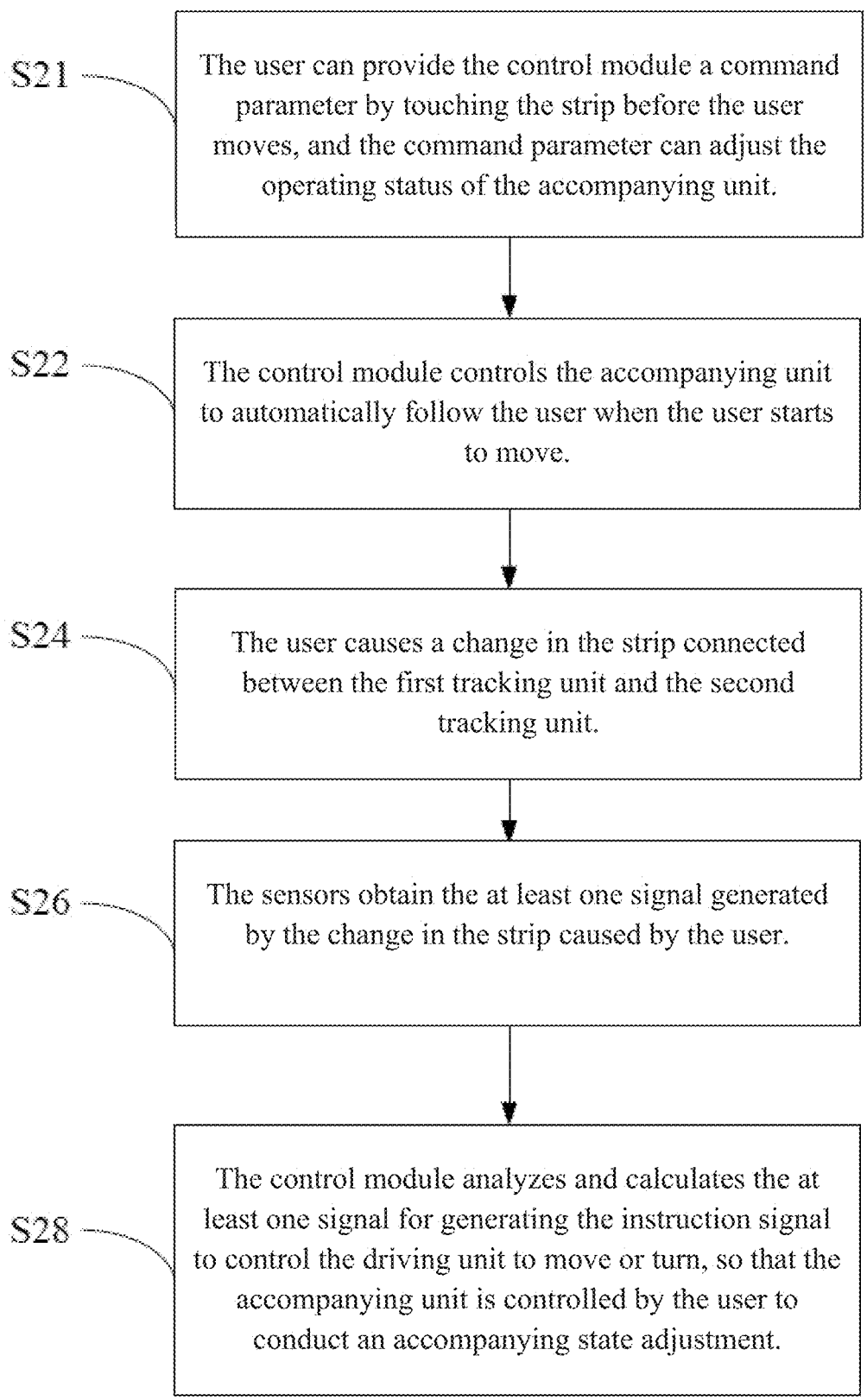
FIG. 9 is a flowchart of a method of one embodiment of the present invention.

Continuing the foregoing content, in the method of using a strip to control accompanying unit and accompanying state provided by the present invention, in addition to the foregoing operation content, as shown in FIG. 9, it can further comprise a step S21 before step S22, which is that the user can provide the control module of the automatic accompanying system a command parameter by touching the strip, and the command parameter can be used to adjust the operating status of the accompanying unit.

On the other hand, in a preferred embodiment provided by the present invention, the user is allowed to touch the strip at any time point in the method to control the control module of the automatic accompanying system, meaning that step S21 can be performed between any two steps of the method.

In a preferred embodiment provided by the present invention, the action of the user touching the strip comprises a variety of motions changes, comprising flicking from right to left, flicking from left to right, pressing down or lifting up; in additional, in a preferred embodiment of the present invention, the action of the user touching the strip can also be modified by the length of time that the user touches the strip, for example, like lifting the strip for a long time, pressing it down shortly twice or lifting it for two short turns and one long turn, to define and design the command parameter. At the same time, in order to enable the strip to sensitively sense the changes caused by the user's touch and interpret the command parameter, the strip is further provided with a sensor communicating connected to the control module for sensing the changes on the strip caused by the user's touching in a preferred embodiment of the present invention. In order to give instructions, the multi-core wire can be further provided with a button, a joystick or any other forms to affect the message transmission of the multi-core.

In additional, the command parameter adjusts and sets operating status and accompanying condition of the automatic accompanying system; wherein the operating status comprises, but is not limited to, turning on, pausing, turning off or other operation modes of the automatic accompanying system, and the accompanying condition comprises, but is not limited to, the set of the preset relative position between the user and the accompanying unit, and the speed of accompanying.

Other features and advantages of the present invention will be further exemplified and explained in the following embodiments, and the embodiments are only used as an auxiliary description and are not intended to limit the scope of the present invention.

Figure 10B:
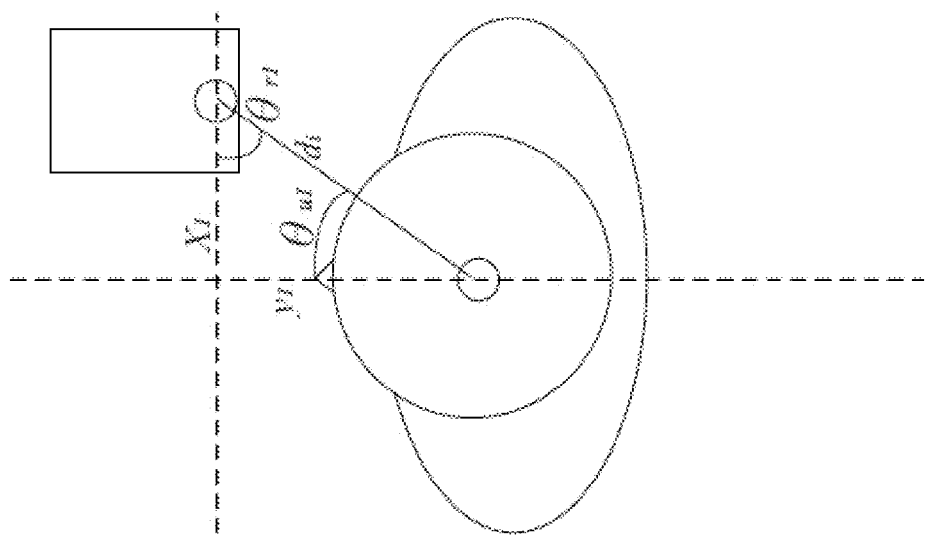
FIG. 10A-10B are the first embodiment of the present invention showing the immediate accompany which is in forward direction.
Figure 10A:
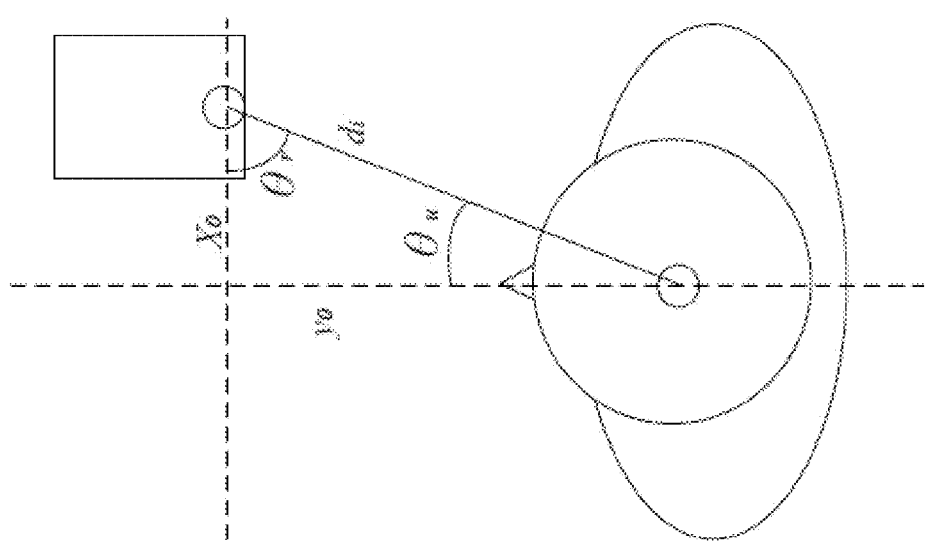

Example 1. The Automatic Accompanying System of the Present Invention Performs Instant Accompanying when a User Moves Forward Referring to FIG. 10A, showing the initial position setting of the automatic accompanying system, wherein the θu is an angle formed by the facing direction and the pointing direction of the user, Or is an angle formed by the facing direction and the pointing direction of the accompanying unit, y0 is a longitudinal distance between the user and the accompanying unit, x0 is a lateral distance between the user and the accompanying unit and di is a linear distance between the user and the accompanying unit. Continuing to refer to FIG. 10B, when the user moves forward, the longitudinal distance between the user and the accompanying unit (y) is shortened, two angles (θu1 and θr1) become larger, and the lateral distance (x) remains the same. At this moment, the relative position difference between the accompanying unit and the initial set value can be calculated by the following formula (Formula 1), which means that the change value of longitudinal distance (y1−y0) can be obtained by calculating the change of the angles. The change value is converted into an instruction signal by the control module, and then the signal is transmitted to the accompanying unit for allowing the accompanying unit to move away from the user longitudinally; therefore the user's action of moving forward can be fed back by calculating the change value of the longitudinal distance (y1−y0). In this way, the accompanying unit can maintain the preset relative position between the user and accompanying unit to achieve the purpose of accompanying.

$$y = d_i \cos \theta_{u1-uo} \tag{Formula 1}$$

Example 2. The Automatic Accompanying System of the Present Invention Performs Instant Accompanying when a User Turns Right FIG. 11A is the initial setting of the automatic accompanying system as described in FIG. 10A, and it is not repeated here.

Figure 11B:
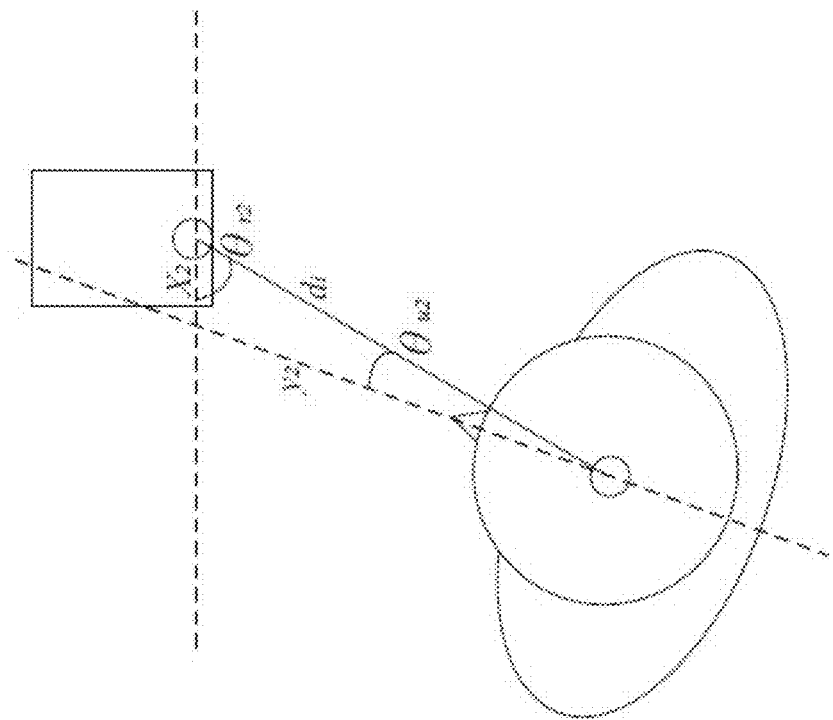
FIG. 11A-11B are the second embodiment of the present invention showing the immediate accompany which is turning right.
Figure 11A:
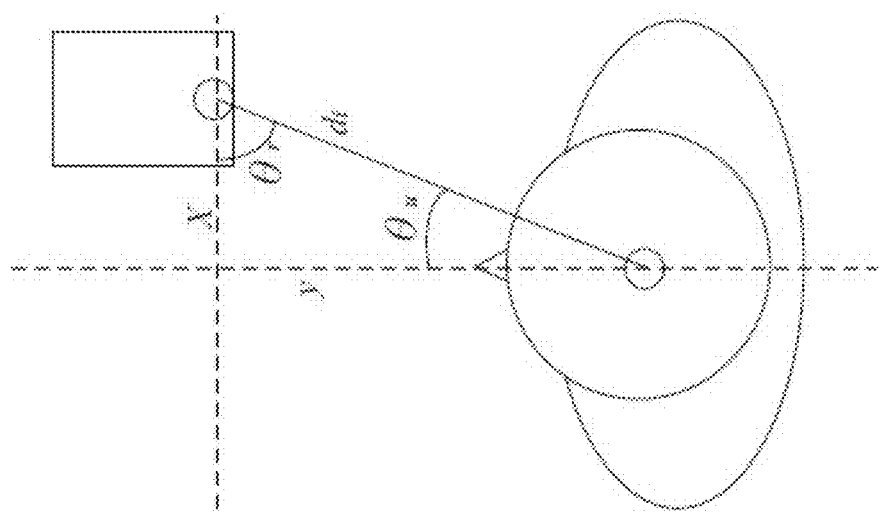

Please continuing to refer to FIG. 11B, when the user turns right, the longitudinal distance (y) between the accompanying unit and the user is increased and the lateral distance (x) between them is decreased; the angle θu2 is increased and the angle θr2 remains the same. In this situation, the relative position difference between the accompanying unit and the initial set value can be calculated by the following formulas (Formula 2 and 3), which means that the change value of the longitudinal distance (y2−y0) and the lateral distance (x2−x0) can be obtained by calculating the change value of the angles (θu2−θu0). These change values are converted into an instruction signal by the control module, and then the signal is transmitted to the accompanying unit for allowing the accompanying unit to move longitudinally towards the user as far as the change value of the longitudinal distance (y2−y0) and move laterally away from the user's facing direction; therefore, the user's action of turning right can be fed back by calculating the change value of the lateral distance (x2−x0). In this way, the accompanying unit can maintain the preset relative position between the user and accompanying unit to achieve the purpose of accompanying.

$$x = d_i \sin \theta_{u2-uo} \tag{Formula 2}$$

$$y = d_i \cos \theta_{u2-u0} \tag{Formula 3}$$

Example 3. The Automatic Accompanying System of the Present Invention Provides Feedback when a User Pulls a Strip FIG. 12A is the initial setting of the automatic accompanying system as described in FIG. 10A, and it is not repeated here.

Figure 12B:
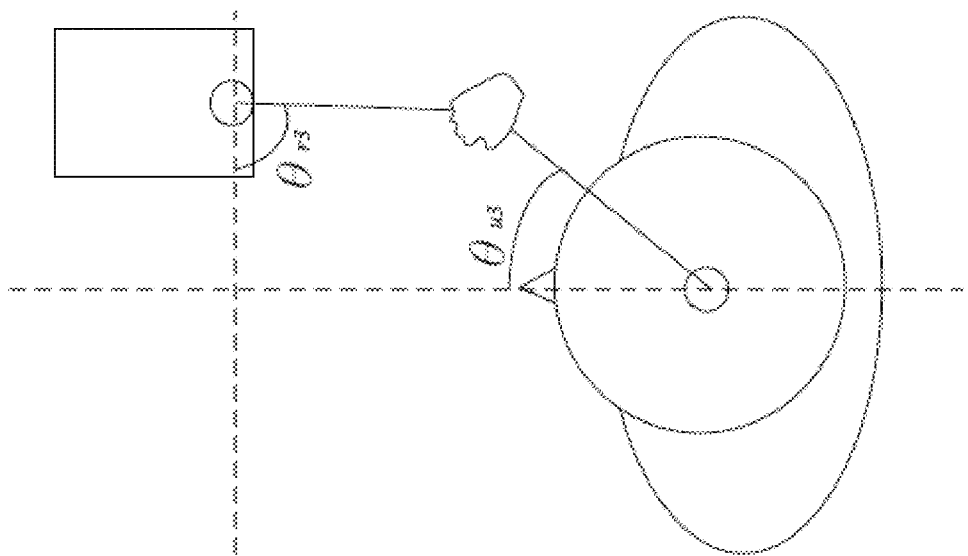
FIG. 12A-12B are the third embodiment of the present invention showing the real time feedback of the strip.
Figure 12A:
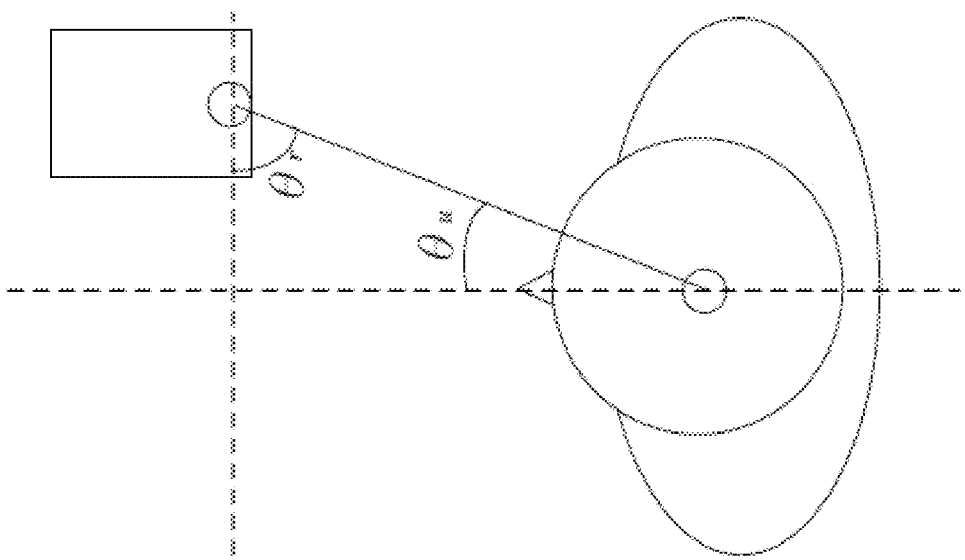

Please continuing to refer to FIG. 12B, when the user pulls the strip with the accompanying unit located on the left of the user, the two angles θu3 and θr3 are increased. In this situation, the control module receives the signal of changes in angles, and then it provides an instruction signal of a specific command action to the accompanying unit according to a preset parameter. Therefore, the accompanying unit gives feedback of the specific command action.

In summary, the present invention provides an automatic accompanying system, which monitors the changes in the facing direction of the user, detects the change in the relative position relationship between the user and the accompanying unit, and processing these signals for instructing the accompanying unit to make feedback and adjustment immediately. Therefore, the accompanying unit can follow the user's dynamic to move to the preset accompanying position and make a corresponding turning action accurately and immediately, allowing the automatic accompanying system to be used for accompanying the user while the accompanying unit is in front of the user. On the other hand, by setting a wire control device between the user and the accompanying unit, the user can touch or pull the wire control device set between the user and the accompanying unit to control the accompanying unit's movement and machine functions, so that the convenience and functionality of the automatic accompanying system can be improved to increase the willingness of elderly people to go out and the safety of the users.

However, the above are only the preferred embodiment of this invention and are not intended to limit the scope of implementation of the present invention. For example, all the modifications and changes in the shapes, structures, features and spirits described in the scope of the invention shall be included in the scope of the present invention.

The invention claimed is:

1. An automatic accompanying system, comprising:
   an accompanying unit comprising a driving unit disposed on the accompanying unit and at least one moving element driven by the driving unit;
   a relative position sensing unit for determining a relative position and orientation relationship between the accompanying unit and a user and obtaining a relative position and an orientation signal based on a customized three-dimensional local coordinate system; and
   a control module for receiving at least the relative position signal and the orientation signal to define which location with respect to the user that the accompanying unit is located at, and comparing at least the relative position signal and the orientation signal with a preset relative position parameter set with respect to the user's local coordinate system for generating an instruction signal transmitted to the driving unit,
   wherein the accompanying unit moves to a specific position and performs a corresponding turning action according to the instruction signal received by the driving unit,
   wherein the specific position comprises a position in front of the user,
   wherein the relative position sensing unit comprises a first tracking unit configured to be disposed on the user, and a second tracking unit disposed on the accompanying unit,
   wherein the first tracking unit and the second tracking unit are configured to sense characteristics of the user and drive the accompanying unit, and the characteristics of the user comprise a dynamic activity characteristic of the user,
   wherein the first tracking unit and the second tracking unit are driven to turn and track when the relative position between the user and the accompanying unit is changed, and
   wherein in response to at least one relative position parameter being set to the control module, the control module drives the accompanying unit to move to a relative position corresponding to the preset relative position parameter for standby, and keeps the relative position corresponding to the preset relative position parameter to accompany during a moving process of the user, the at least one relative position parameter indicating a linear distance between the accompanying unit and the user, a lateral distance between the accompanying unit and the user, and a longitudinal distance between the accompanying unit and the user.

2. A method of operating the automatic accompanying system of claim 1 for accompanying the user dynamically, comprising:
   setting at least one relative position parameter set with respect to the user's local coordinate system to the control module;
   the first pointing unit obtaining the orientation signal and transmitting the orientation signal to the control module;
   the relative position sensing unit obtaining the relative position signal and transmitting the relative position signal to the control module;
   the control module comparing the relative position signal and the orientation signal with the preset relative position parameter set with respect to the user's local coordinate system for generating the instruction signal;
   the control module transmitting the instruction signal to the driving unit to control the accompanying unit to move, turn, or stop and maintaining the relative position relationship and orientation defined by the at least one relative position parameter set; and
   repeating the steps of obtaining and comparing the orientation and relative position signals, generating and transmitting the instruction signal and maintaining the relative position relationship and orientation until the user stops using the automatic accompanying system.

3. The automatic accompanying system of claim 1, wherein the moving element is an omnidirectional wheel set or a mecanum wheel set.

4. The automatic accompanying system of claim 1, wherein the automatic accompanying system further comprises: a first pointing unit for detecting a facing direction of a user and obtaining the orientation signal of the user based on a customized three-dimensional local coordinate system; and a second pointing unit for detecting a facing direction of the accompanying unit and obtaining an orientation signal of the accompanying unit based on the customized three-dimensional local coordinate system;
   wherein the control module further receives the orientation signal of the user to define which location with respect to the user that the accompanying unit is located at, and further compares the orientation signal of the user with the preset relative position parameter set with respect to the user's local coordinate system for generating the instruction signal.

5. The automatic accompanying system of claim 4, wherein a pointing direction of the first tracking unit and the facing direction of the user form a first angle;
   wherein a pointing direction of the second tracking unit and the facing direction of the accompanying unit form a second angle;

the relative position sensing unit further comprises a distance sensor disposed on the user or the accompanying unit for measuring a distance between the user and the accompanying unit to obtain a distance signal, and wherein the pointing direction of the first tracking unit points to the second tracking unit and the pointing direction of the second tracking unit points to the first tracking unit.

6. The automatic accompanying system of claim 5, wherein the first tracking unit and the second tracking unit are connected by a strip to form a string pot pointing device, wherein the first tracking unit and the second tracking unit are pulled by the strip to track and align with each other.

7. The automatic accompanying system of claim 6, further comprising a wearable unit configured to be disposed on the user, a first angle sensor and a second angle sensor, wherein the first angle sensor is disposed on the wearable unit and senses the first angle to obtain a first angle signal, wherein the second angle sensor is disposed on the accompanying unit for sensing the second angle to obtain a second angle signal, wherein each of the first angle sensor and the second angle sensor are a laser scanner, an image processing unit, a radio frequency, an electronic compass, a gyroscope, a goniometer, a variable resistor, a rotary encoder, an inertial sensor or any combination thereof.

8. The automatic accompanying system of claim 6, wherein the strip is a retraction wire, a dangling wire, a catenary, a rope or a multi-core wire.

9. A method of operating the automatic accompanying system of claim 6, comprising:

obtaining, by the first tracking unit and the second tracking unit, a changed signal in the strip resulted from the user causing a change in the strip connected between the first tracking unit and the second tracking unit; and analyzing, by the control module, the changed signal for generating the instruction signal to control the driving unit to move, turn, or stop, so that the accompanying unit is controlled by the user to conduct an accompanying state adjustment to adjust an accompanying state of the automatic accompanying system.

10. The method of claim 9, wherein the change in the strip is a change in length or a change in pointing angle.

11. The method of claim 9, wherein the accompanying state adjustment is a relative position relationship adjustment, a relative angle adjustment, a displacement rate adjustment or an acceleration adjustment.

12. The method of claim 9, wherein the at least one signal comprises a distance signal, a first angle signal, a second angle signal, or a strip length signal.

13. The method of claim 9, further comprising, in response to the user touching the strip before moving, generating, by the control module, a command parameter for adjusting the accompanying state of the accompanying unit.

14. The method of claim 13, wherein the strip is a multi-core wire, wherein the multi-core wire is connected to a button or a joystick to generate a signal to adjust the operating status of the accompanying unit or set a mode of the accompanying unit.

15. The method of claim 13, wherein the command parameter is a start system command parameter, a stop system command parameter, or an accompanying state setting command parameter.

16. The automatic accompanying system of claim 5, wherein the distance sensor is an infrared rangefinder, an image sensor, a laser rangefinder, a string pot displacement sensor, an ultrasonic rangefinder, a radio frequency, a time of light sensor, a stereo computer vision system, or any combination thereof.

17. The automatic accompanying system of claim 5, wherein each of the first tracking unit and the second tracking unit is a magnetic attraction device, a heat source tracking system, an image tracking system, an object tracking system, an optical alignment system or any combination thereof.

* * * * *